Feb. 22, 1944.   H. A. MARTIN   2,342,419
METHOD OF CONCENTRATING DEHYDRATING SOLUTIONS
Filed Aug. 30, 1939   2 Sheets-Sheet 1

INVENTOR
Henry Arthur Martin.
BY Arthur C. Brown
ATTORNEY

Feb. 22, 1944.　　　　H. A. MARTIN　　　　2,342,419
METHOD OF CONCENTRATING DEHYDRATING SOLUTIONS
Filed Aug. 30, 1939　　　2 Sheets-Sheet 2
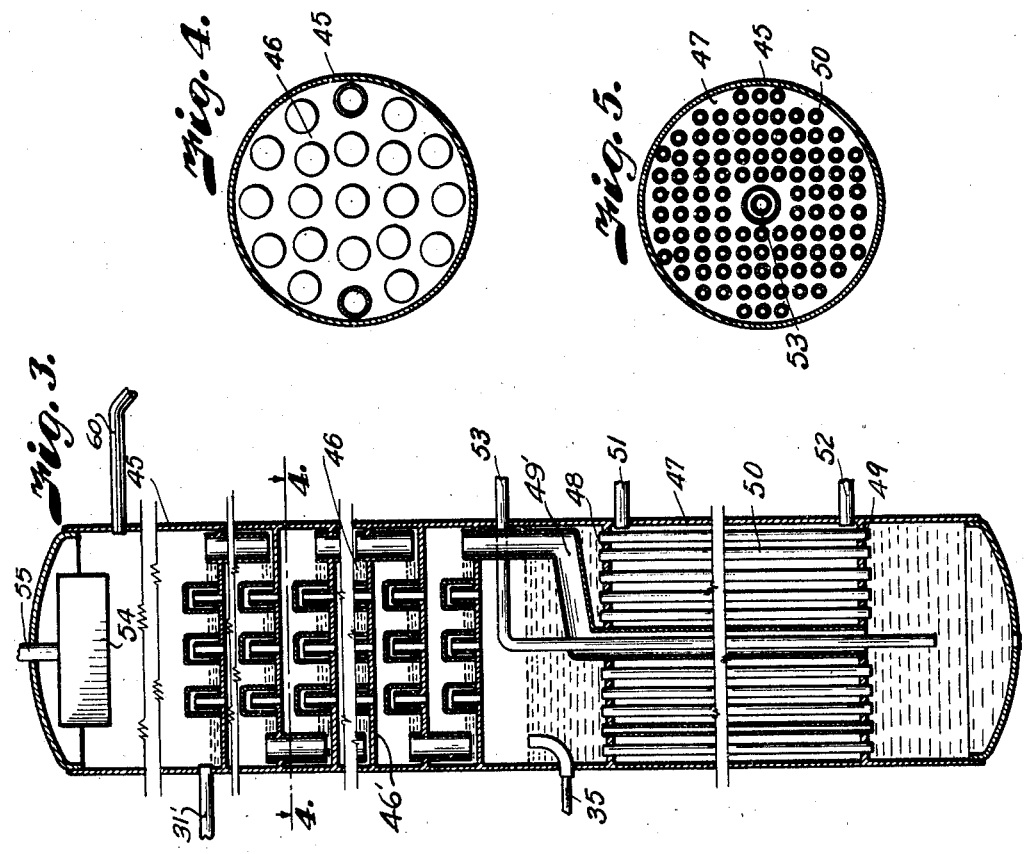
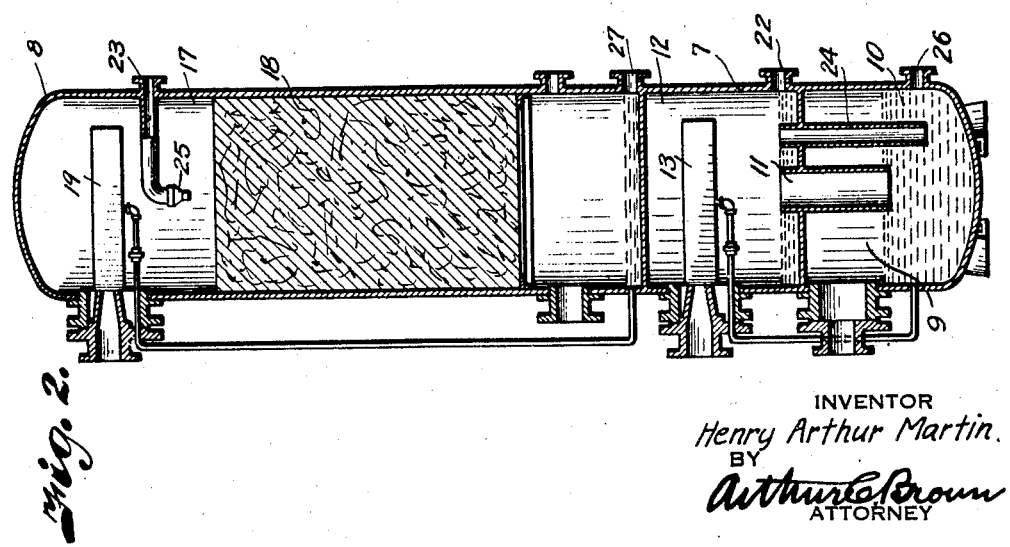
INVENTOR
Henry Arthur Martin.
BY
Arthur L. Brown
ATTORNEY Patented Feb. 22, 1944

2,342,419

UNITED STATES PATENT OFFICE 2,342,419

METHOD OF CONCENTRATING DEHYDRATING SOLUTIONS

Henry Arthur Martin, Kansas City, Mo.

Application August 30, 1939, Serial No. 292,677

3 Claims. (Cl. 159—47)

This invention relates to a method for reconcentrating dehydrating solutions and particularly to removal of water from solutions employed in dehydration of natural gas in high pressure gas transportation systems.

The principal object of the invention is to provide an effective and economic method of reconcentrating a dehydrating solution at relatively low temperatures thereby permitting use in gas dehydrating systems of more effective solutions, ordinarily damaged by high temperature treatments.

In accomplishing this and other objects of the invention, as hereinafter pointed out, I have provided improved details of structure, the preferred form of which is illustrated in the accompanying drawings, wherein:

Fig. 2 is a vertical section through the dehydrating tower within which the gas is contacted by a dehydrating solution.

Fig. 3 is a vertical section through the dehydrate reconcentrator.

Fig. 4 is a horizontal section through the bubble section of the reconcentrator.

Fig. 5 is a similar section through the gas heating section of the reconcentrator.

Figure 1:
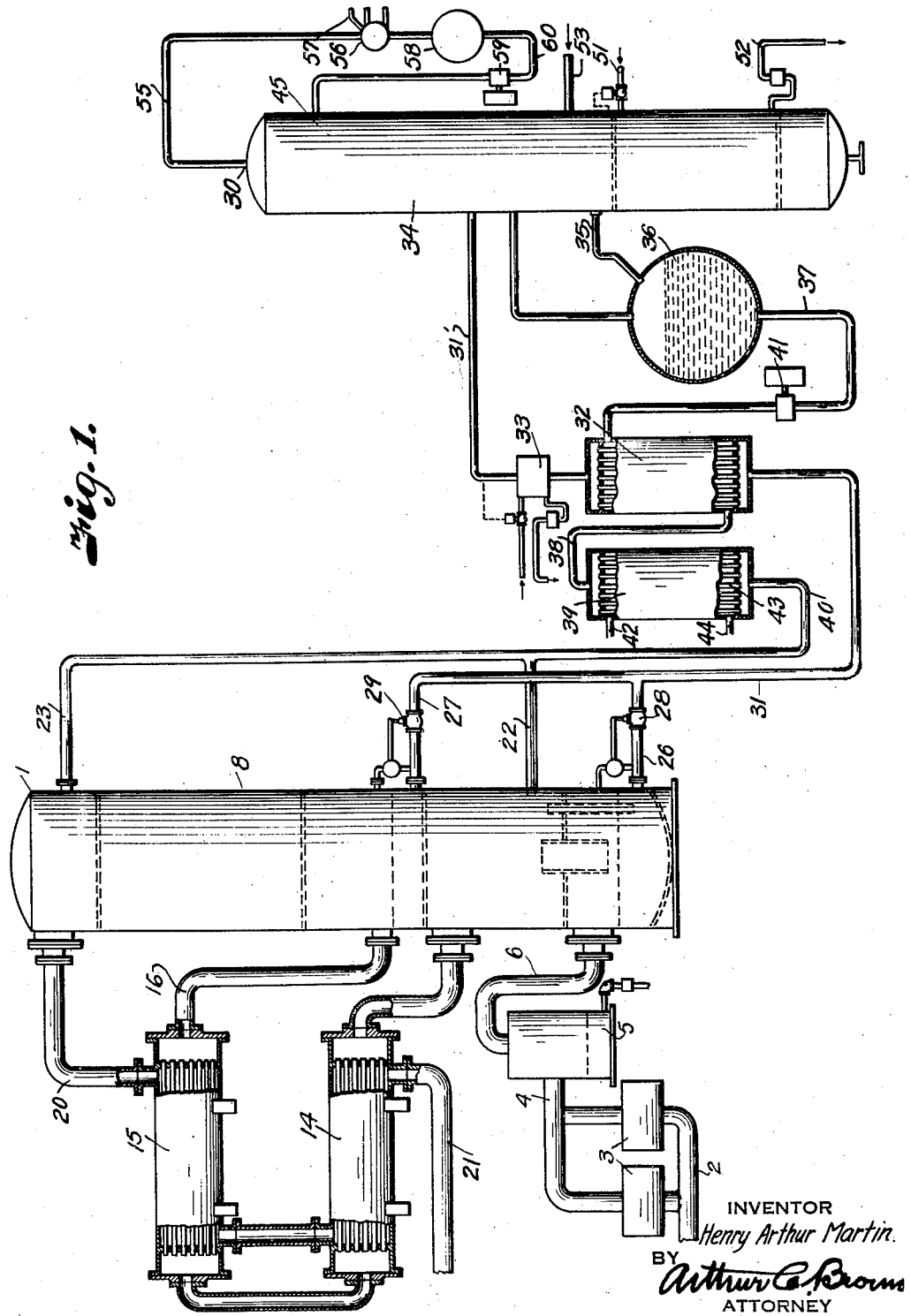
Fig. 1 is a diagrammatic view of a gas dehydrating system equipped with a dehydrating solution rectifier constructed and operated in accordance with the present invention.

Referring more in detail to the drawings:

1 designates a dehydrating apparatus for the treatment of natural gas in large volumes and high pressures encountered in present day gas transportation systems so that the gas treated therein is sufficiently dehydrated to prevent formation of gas hydrates or "freeze-ups" in the transportation system.

Gas from the field of supply is compressed to substantially normal station discharge pressures and delivered to the treating apparatus 1 through a pipe 2 connected with preliminary coolers 3 and discharged through a pipe 4 into a separator 5 wherein entrained water or readily condensable vapor is removed from the gas, the gas being discharged through a pipe 6 into a lower section 7 of a dehydrating tower 8. The gas is initially contacted in the tower with a dehydrating solution which may consist of a mixture of calcium chloride, water, and glycerin.

The section 7 of the tower 8 includes a chamber 9 in which the gas is admitted for flow through a body of the dehydrating solution 10 carried in the bottom thereof and through which it flows for escape through a tube 11 into an upper chamber 12, and is discharged through a spray extractor 13 into heat exchangers 14 and 15, wherein the partially dehydrated gas is indirectly cooled with the completely treated gas prior to its return to the gas transportation system.

The incoming gas, upon being discharged from the heat exchangers, is delivered through a pipe 16 into an upper dehydrating section 17 of the tower 8. In this section the gas passes upwardly through a contacting media 18 which is thoroughly wetted by the dehydrating solution so that any water vapor remaining in the gas is absorbed by the solution prior to its discharge through a spray extractor 19 into a pipe 20 leading to the heat exchangers where the gas is warmed through heat exchange with incoming gas, and then discharged through a pipe 21 into the gas transportation system.

The dehydrating solution is delivered at sufficiently low temperature to promote absorption of water vapor through inlet pipes 22 and 23 respectively connected with the upper and lower sections of the dehydrating tower. The dehydrating solution discharges into the chamber 12 through the pipe 22 and overflows through a pipe 24 into the lower chamber 9 to maintain the body of solution 10. The pipe 23 is connected with the top of the upper section and discharges through a nozzle 25 onto the contacting media 18. After contacting the gas and absorbing the water vapor content thereof, the solution gravitates to the bottoms of the respective treating sections and is discharged through pipes 26 and 27 under control of constant level maintaining valves 28 and 29, as shown in Fig. 1.

In order that the spent solution may be reconditioned and recirculated through the dehydrator at its original concentration, it is necessary to remove the absorbed water, and this is effected by passing the diluted solution through a reconcentrating apparatus 30, constituting the principal subject matter of the present invention.

Dehydrating solutions are usually reconcentrated through the application of heat to drive off the water constituent which has been absorbed in the dehydrator, but heat sufficient to effect vaporization of the water is injurious to the more effective dehydrating solutions above mentioned, and I have, therefore, provided a method and apparatus whereby the reconcentration may be effected at relatively low temperatures, that is, below the temperatures at which the dehydrating solutions are ordinarily damaged.

In carrying out my invention, the solution is initially heated to raise the temperature thereof but the temperature is kept below that at which the solution is damaged, and then contacted with an inert gas which may be a small portion of the dehydrated natural gas treated in the dehydrating apparatus. This gas may be initially heated or heated at the time of contact with the dehydrating solution so as to increase the water stripping properties of the inert gas to that necessary in effecting the proper reconcentration of the solution.

The discharge pipes 26 and 27 are, therefore, connected by a common pipe 31 which delivers the spent dehydrating solution to a heat exchanger 32, then through a preheater 33 and into a reconcentrating tower 34 through a pipe 31' where the solution is contacted with the inert gas, after which it is withdrawn through a pipe 35 and discharged into a storage tank 36, ready for return to the dehydrating apparatus through a pipe 37 connected with the heat exchanger 32, a pipe 38 connecting the heat exchanger 32 with a cooler 39, and a pipe 40 connecting the cooler with the pipes 23 and 24, the reconcentrated solution being returned to the system under pressure of a pump 41 connected in the pipe 37.

Since the solution collecting in the tank 36 is relatively warm, it is passed through the heat exchanger 32 to initially raise the temperature of the spent solution, and at the same time effect cooling thereof. After passing through the heat exchanger 32, the solution is passed through the cooler 39. A cooling medium, for example water, may be delivered to the cooler through an inlet connection 42, and after circulating around a bundle of tubes 43, through which the reconcentrated solution is passed, it is discharged through an outlet connection 44.

The reconcentrating tower 34 is best illustrated in Fig. 3 and includes a tank 45 having an upper bubble section 46 and a lower heating section 47. The bubble section 46 consists of a series of bubble cap trays 46' onto which the dehydrating solution is discharged to flow from tray to tray into the heating section 47. The heating section 47 is formed by tube sheets 48 and 49 carrying tubes 50 around which a relatively low temperature heating medium, such as steam, is circulated through an inlet 51 and discharged by way of an outlet 52.

The dehydrating solution flows from the lower bubble tray through a pipe 49' leading into the section of the tank below the diaphragm 49 and rises through tubes 50 to the level of the inlet of pipe 35 for flow to the tank 36. The dehydrating solution is directly contacted with the dry, inert gas which gas is delivered into the tank through a pipe 53 extending downwardly through the pipe 49 and into the body of heated solution below the tube sheet 49 so that the gas discharging from the pipe 53 bubbles upwardly through the body of solution to absorb the excess water that has been picked up by the solution in the dehydrator. The gas, after thoroughly contacting the solution, rises upwardly in the bubble section of the tower and bubbles through the solution in the respective trays after which the gas is discharged through a spray extractor 54 by way of a pipe 55 having connection with a condenser 56 wherein the gas is cooled and the water condensed out. The gas may then be discharged through a pipe 57 for use as fuel or other purposes. The reflux from the condenser passes into a tank 58 and is circulated by a pump 59 through a pipe 60 for flow through the bubble section of the reconcentrating tower.

From the foregoing it is obvious that I have provided a method of reconcentrating the dehydrating solution wherein the excess water content is removed by absorbing contact with inert, dry gas under relatively low temperatures because the presence of the stripping gas lowers materially the temperature at which the water vapor leaves the solution. The amount of gas used is relatively small and may be consumed as fuel for driving compressors or in generating the steam employed in the system.

What I claim and desire to secure by Letters Patent is:

1. The method of rectifying a moisture laden dehydrating solution including, effecting substantially continuous flow of the moisture laden dehydrating solution through bubble stages to a heating zone, contacting the moisture laden dehydrating solution with a dry gas below the heating zone, bubbling the dry gas through the moisture laden dehydrating solution contained in said heating zone to effect stripping of moisture contained in the solution by the dry gas, effecting substantially continuous removal of the moisture freed dehydrating solution from the heating zone, and passing the gas from the heating zone through said bubble stages.

2. The method of rectifying a moisture laden dehydrating solution including, passing the moisture laden dehydrating solution through a series of bubble stages to initially remove a part of contained moisture, collecting the dehydrating solution in a heating zone, bubbling a dry natural hydrocarbon gas through the solution collected in said heating zone to strip moisture remaining in said dehydrating solution, passing the natural hydrocarbon gas from the heating zone through said bubble stages for effecting said initial removal of moisture from the moisture laden dehydrating solution, removing the natural hydrocarbon gas containing the absorbed moisture from said bubble stages, and discharging said moisture freed dehydrating solution from the heating zone.

3. The method of rectifying a moisture laden dehydrating solution including, passing the moisture laden dehydrating solution through a series of bubble stages to effect an initial removal of a part of the contained moisture, collecting the dehydrating solution in a heating zone, bubbling a dry natural gas through the solution collected in said heating zone to strip moisture remaining in said dehydrating solution, passing the natural hydrocarbon gas from the heating zone through said bubble stages for effecting said initial removal of moisture from the moisture laden dehydrating solution, removing the natural gas containing the absorbed moisture from said bubble stages, removing spray carried by said gas for return to the bubble stages, and discharging said moisture freed dehydrating solution from the heating zone.

HENRY ARTHUR MARTIN.